United States Patent [19]

Blake et al.

[11] Patent Number: 5,083,803
[45] Date of Patent: Jan. 28, 1992

[54] MATERIALS HANDLING VEHICLE USING EITHER CUSION OR PNEUMATIC TIRES

[75] Inventors: Nathan L. Blake, Coldwater; John R. Harman, Versailles; Carl H. Pohl, Maria Stein, all of Ohio

[73] Assignee: Crown Equipment Corporation, New Bremen, Ohio

[21] Appl. No.: 621,100

[22] Filed: Nov. 30, 1990

[51] Int. Cl.$^5$ .................. B62D 33/08; B60G 9/04
[52] U.S. Cl. ................... 280/43; 180/905; 267/276; 267/281; 301/125
[58] Field of Search ........... 280/671, 673, 43, 43.11, 280/43.12; 180/905, 906; 267/153, 276, 279, 281, 292, 293; 301/124 R, 125

[56] References Cited

U.S. PATENT DOCUMENTS

| | | | |
|---|---|---|---|
| 108,745 | 10/1870 | Walcott | 267/293 |
| 1,409,781 | 3/1922 | Rimailho | 267/279 X |
| 2,190,091 | 2/1940 | Wolfe | 280/43 |
| 2,811,368 | 10/1957 | Clausen | 280/43 |
| 3,216,740 | 11/1965 | Peras | 267/281 X |
| 3,489,238 | 1/1970 | Kruckman | 180/65.1 X |
| 3,556,555 | 1/1971 | Abbott et al. | 267/276 X |
| 3,572,677 | 3/1971 | Damon | 267/281 |
| 3,820,618 | 6/1974 | DePauw et al. | 280/43 X |
| 4,921,265 | 5/1970 | Eyb et al. | 180/906 X |

FOREIGN PATENT DOCUMENTS

| | | | |
|---|---|---|---|
| 927422 | 5/1955 | Fed. Rep. of Germany | 280/43 |
| 0223344 | 10/1986 | Japan | 267/293 |

Primary Examiner—Andres Kashnikow
Assistant Examiner—Brian L. Johnson
Attorney, Agent, or Firm—Biebel & French

[57] ABSTRACT

A materials handling vehicle or fork lift truck may be equipped with either cushion or pneumatic tires. When converting the vehicle from cushion to pneumatic tires, the front axle is moved downward and the mast assembly is moved forward to provide adequate clearance. The rear axle is also moved downward and backward. Changing configurations requires the addition of only one component; all of the other axle mounting hardware can be either repositioned or its orientation reversed in order to accommodate the change.

5 Claims, 7 Drawing Sheets

MATERIALS HANDLING VEHICLE USING EITHER CUSION OR PNEUMATIC TIRES

BACKGROUND OF THE INVENTION

This invention relates to a materials handling vehicle that can be modified quickly and inexpensively to use either cushion tires or pneumatic tires.

Materials handling vehicles, such as fork lift trucks, may operate in a variety of different environments. When operating primarily inside a structure where the surface is generally smooth and relatively clean and dry, a cushion tire is preferred, and when operating out-of-doors where more adverse conditions previal, a pneumatic tire is preferred. Cushion tires typically provide a more stable platform for the vehicle. Pneumatic tires are larger in diameter than cushion tires and provide better traction, especially under adverse conditions.

Usually, a truck manufacturer will design a truck for use with either cushion tires or pneumatic tires. It is possible, however, to change an existing fork lift truck from one type of tire to the other, but in doing so, major adjustments must be made to accommodate the different tire diameters. These adjustments are necessary to provide the proper clearance between the tire and the body of the truck, and also to increase the wheel base when using pneumatic tires. Converting from one type of tire to another is both time consuming and expensive and requires the manufacturer to maintain an inventory of those parts necessary to accomplish the conversion.

What is needed is a truck that can use either cushion or pneumatic tires, where the conversion can be made without extensive inventories of parts, and a truck that can be converted quickly, either in the factory immediately prior to delivery, or by the dealer.

SUMMARY OF THE INVENTION

The present invention is directed to a materials handling vehicle that may use either cushion and pneumatic tires with a minimum of inventory and inconvenience.

In the present invention, a single truck frame is designed to accept either cushion or pneumatic tires primarily by selecting the positioning of certain hardware that is used for mounting the axles. By designing the mounting hardware properly, orientation in one position accommodates cushion tires and orientation in the other position accommodates pneumatic tires.

Specifically, the front axle of the truck is supported on the frame in one of two vertical positions. The front axle assembly includes a pair of mounting brackets each provided with a guide pin and a pair of mounting holes. The frame of the truck is provided with multiple guide pin receiving openings and mounting holes arranged to accept the axle mounting bracket in one of the two vertical positions. The mast assembly of the truck is supported by the axle assembly itself, so when the assembly is mounted in the lower position, an adapter member is used to raise the mast assembly to its original position.

The rear axle of the truck may also be mounted in one of two vertical positions by the orientation of a bushing and in one of two horizontal positions by rotating a support casting.

It is therefore an object of this invention to provide a novel materials handling vehicle, such as a fork lift truck, that can be modified quickly and inexpensively, to be used with either cushion or pneumatic tires.

It is a further object of this invention to provide, in a materials handling vehicle including a vehicle frame member, a first axle for supporting load wheels, a second axle for supporting steered wheels, a mast assembly for supporting and raising a load, an improvement comprising means for supporting said first axle on said frame member in either a first or a second vertical position, means for supporting said second axle on said frame member in either a first or a second vertical position, and means for supporting said second axle on said frame member in either a first or a second horizontal position.

It is a still further object of this invention to provide a materials handling vehicle including a frame, a first axle supported on said frame for carrying a first set of wheels, a second axle supported on said frame for carrying a second set of wheels, a mast assembly for supporting and raising a load, said mast assembly being carried by said first axle, the improvement, for permitting the vehicle to use either cushion of pneumatic tires, comprising means for supporting said first axle on said frame in either a first or a second vertical position, said means including a first member permanently attached to said first axle and including multiple, vertically arranged, bolt holes and a guide pin, and a second member supported by said frame, and including multiple bolt receiving holes corresponding to the bolt holes in said first member in either said first or said second vertical position, means for supporting said second axle on said frame in either a first or a second vertical position including a pivot member and a pair of resilient bushings, each of said bushings including a pivot member receiving opening positioned asymmetrically vertically whereby the pivot member may be supported in one of two vertical positions, and means for supporting siad second axle in either a first or a second horizontal postion, said means including said pivot member having a axle supporting pad positioned differentially between said bushings for supporting said axle lengthwise of said vehicle in one of two horizontal positions.

Other objects and advantages of the invention will be apparent from the following description, the accompanying drawings and the appended claims.

DESCRIPTION OF THE PREFERRED EMBODIMENT

Figure 1:
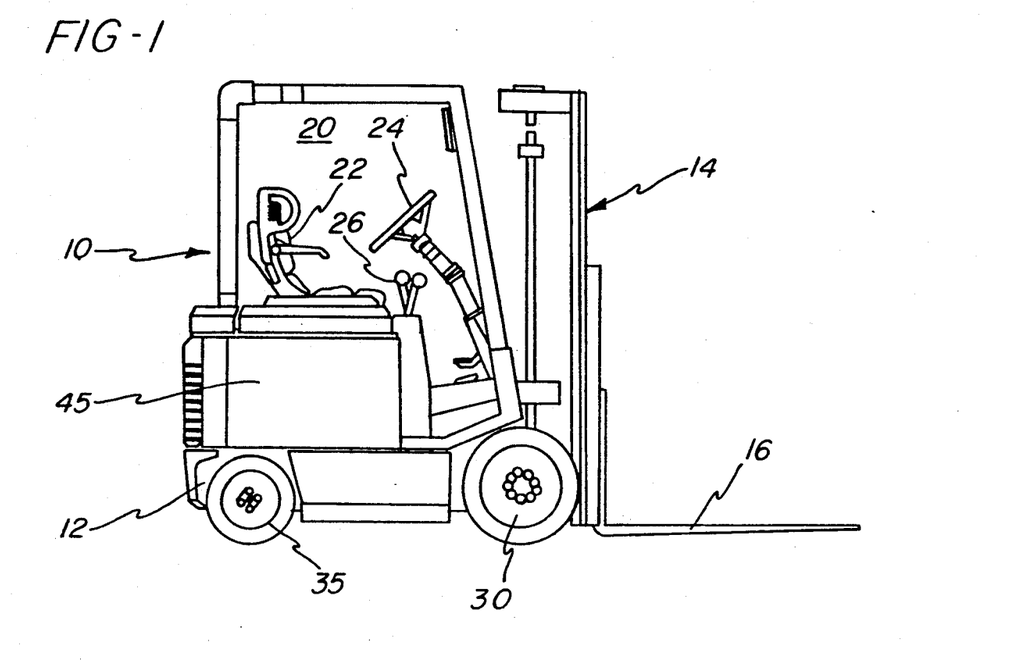
FIG. 1 is an elevational view of a fork lift truck employing the features of the present invention.
Figure 2:
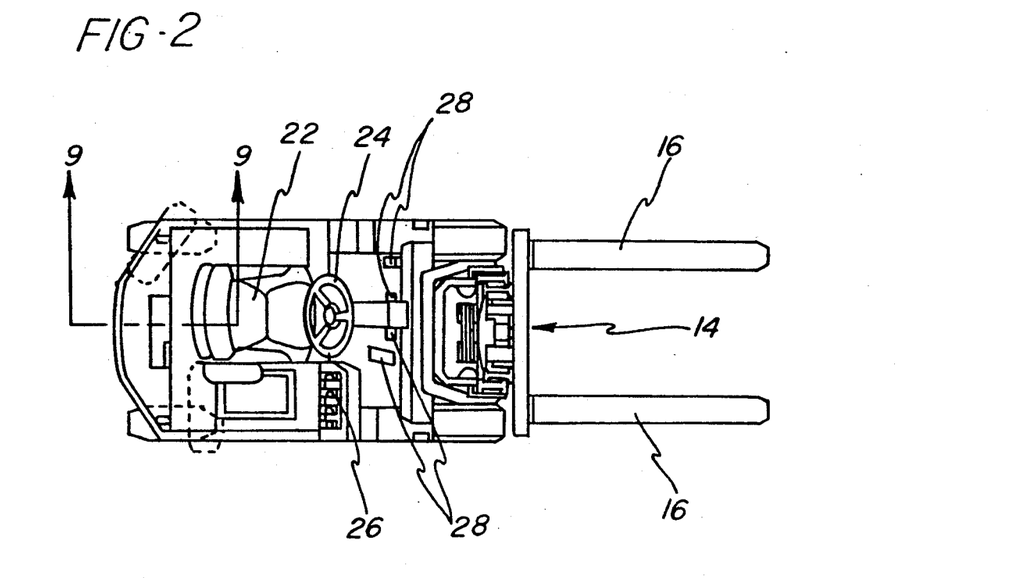
FIG. 2 is a plan view of the fork lift truck of FIG. 1.

Referring now to the drawings which illustrate a preferred embodiment of the invention, and particularly to FIG. 1, a materials handling vehicle or fork lift truck 10 is mounted on a supporting frame 12 and includes a mast assembly 14, including forks 16, at its forward end and an operator's compartment 20. The operator's compartment 20 is provided with a seat 22, steering wheel 24, control handles 26, and foot pedals 28.

A pair of load wheels 30 are placed at the forward end of the truck and a pair of steerable wheels 35 are placed at the rear of the truck. In the truck shown, a traction motor 40 (FIG. 3) is connected to drive the load wheels 30. Power to the traction motors and for other purposes is provided by batteries located within the truck at 45.

In the fork lift truck illustrated, the wheels 30 and 35 may be fitted with either cushion or pneumatic tires. Typically, the cushion tires for the front or load wheels 30 are 21 inches in diameter while pneumatic tires are 23 inchers in diameter. Cushion tires for the back or steer wheels 35 are typically 16 inches in diameter while pneumatic tires are 18 inches in diameter.

Figure 3:
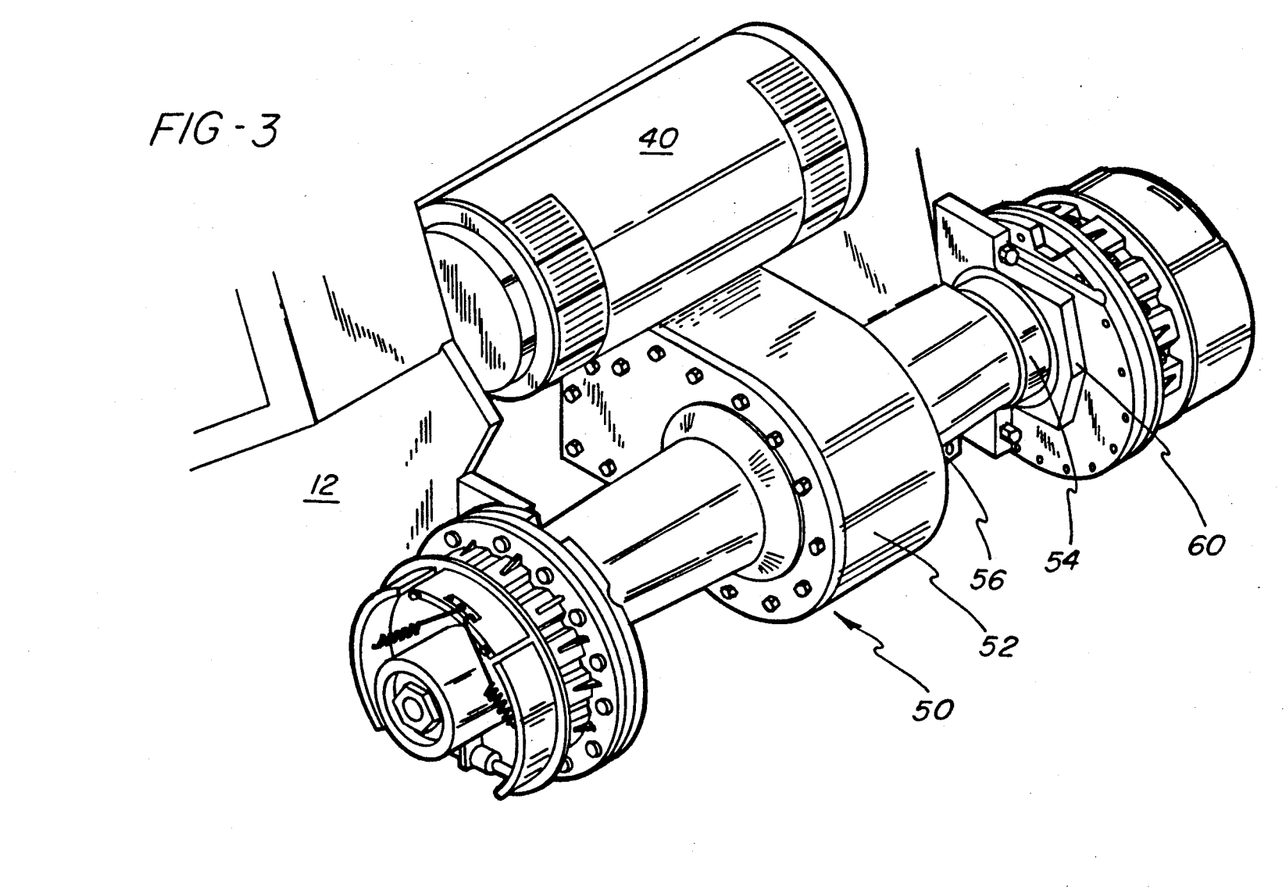
FIG. 3 is a perspective view of the front axle of the truck showing the axle mounting brackets and the trunions for supporting the mast assembly.

The front wheels 30 are carried by a first axle assembly 50, shown in FIG. 3. This axle assembly includes the traction motor 40 and a housing 52 that extends transversely across the truck. The housing is provided with trunions 54 to receive and support the mast assembly 14.

Figure 4A:
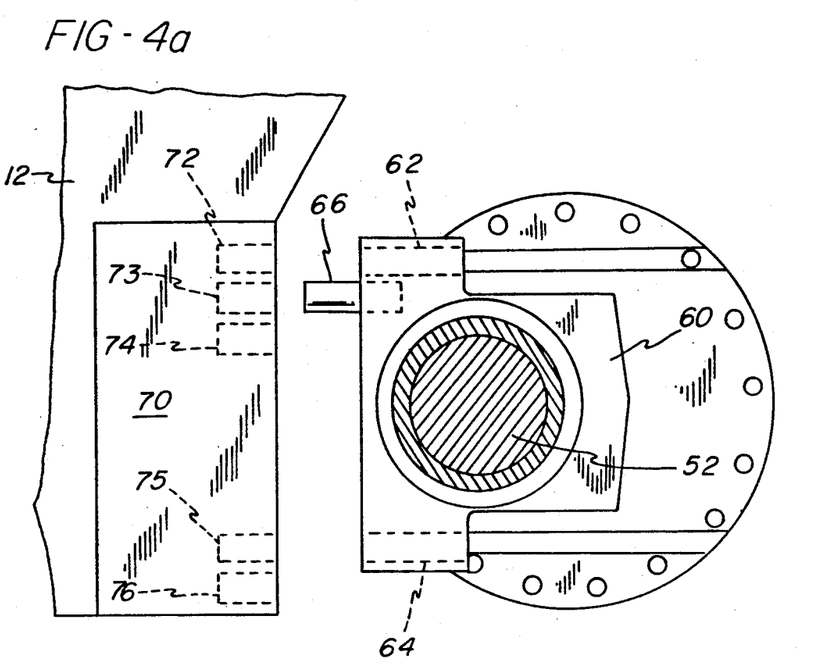
FIGS. 4a and 4b are enlarged views of the front axle mounting arrangement with FIG. 4a showing a mounting bracket for the load wheel axle in the cushion tire configuration and FIG. 4b showing the mounting bracket in the pneumatic tire configuration.
Figure 4B:
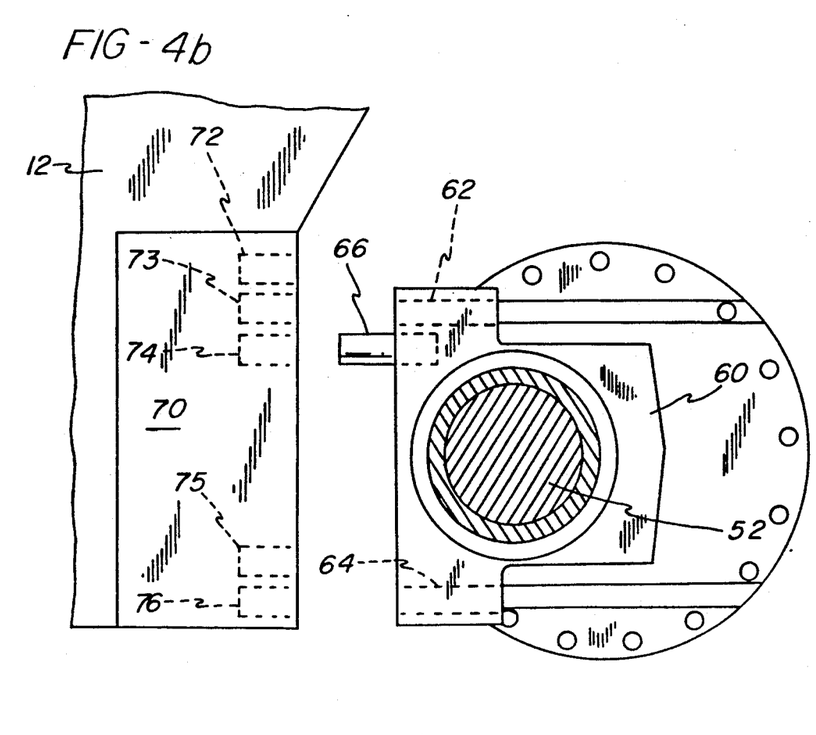

In the present invention, means are provided for supporting the first or front axle on the frame 12 in either a first or second vertical position. As shown in FIGS. 4a and 4b, a first member or mounting bracket 60 is permanently attahced to each end of the first axle assembly 50 adjacent the wheels. Each mounting bracket 60 includes multiple, vertically arranged, bolt holes 62 and 64 and a guide pin 66.

A second member or support fixture 70 is supported by or welded to the frame 12, and it includes multiple bolt receiving holes 72-76 corresponding to the bolt holes in the mounting bracket 60. The bolt holes 72-76 are internally threaded to capture the threads of bolts extending through the mounting bracket 60 when the axle is mounted to the frame. The holes 72, 73 and 74, and holes 75 and 76, are placed approximately one and one-half inch apart to accommodate the difference between the diameters of cushion and pneumatic tires.

FIG. 4a shows the mounting of the front axle to the frame when using cushion tires. In this configuration, the bolt hole 62 is aligned with the uppermost bolt receiving hole 72 while bolt hole 64 is aligned with bolt receiving hole 75. The alignment pin or dowel 66 will be placed in the opening 73 to help support and steady the axle while the attaching bolts are installed.

FIG. 4b shows the mounting of the front axle to the frame when using pneumatic tires. The dowel 66 is placed in the hole 74 while bolt holes 62 and 64 are aligned with bolt receiving holes 73 and 76. Thus, the axle assembly 50 may be supported in either a first or a second vertical position, as illustrated in FIGS. 4a and 4b.

When using pneumatic tires, and therefore when the axle is supported as shown in FIG. 4b, it is necessary to return the mast assembly 14 to its original vertical position relative to the floor, and also move the mast assembly forward relative to the frame in order to provide additional clearance for the tire.

Figure 5A:
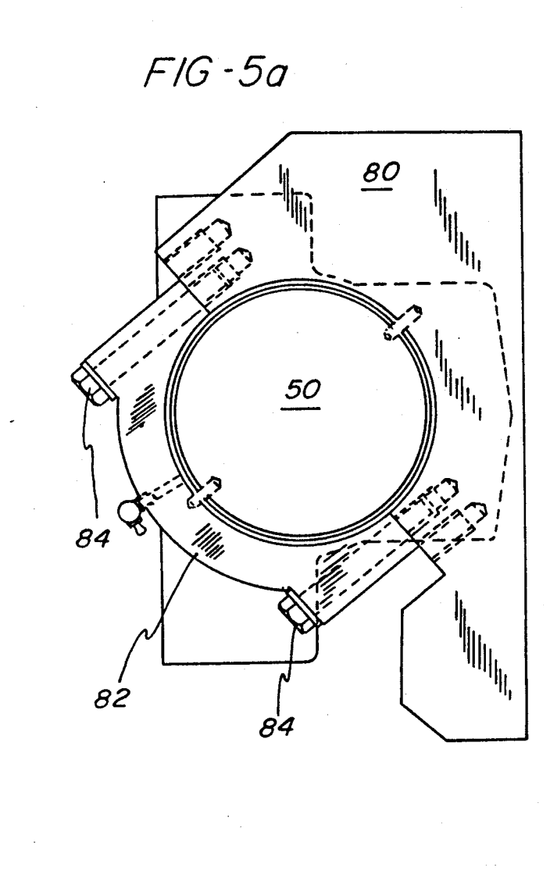
FIGS. 5a and 5b are enlarged views of the mast mounting bracket with FIG. 5a showing the cushion tire configuration and FIG. 5b showing the pneumatic tire configuration.
Figures 5B, 6:
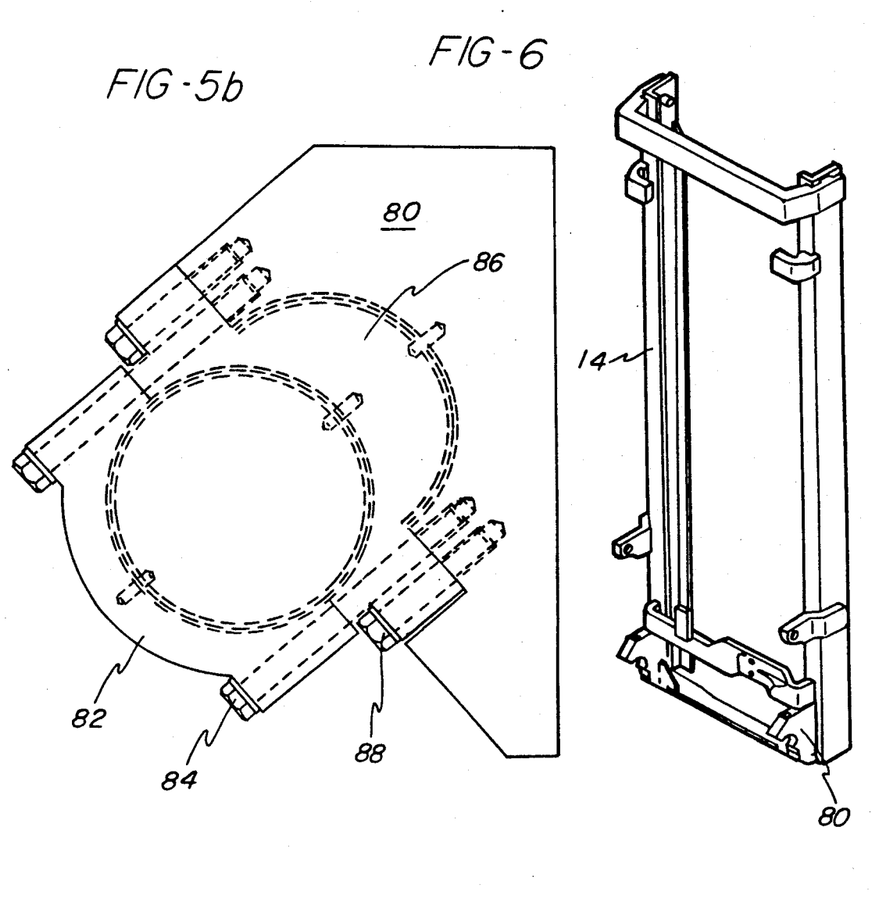
FIG. 6 is a perspective view of a portion of the mast assembly.

As shown in FIGS. 5a, 5b and 6, the mast assembly 14 is provided with a pair of mounting brackets 80 that are designed to mount on the trunion areas 54 and 56 on the axle assembly 50 (FIG. 3). The upper end of the mast assembly 14 is connected to a mast tilting cylinder (not shown).

When cushion tires are used, the mounting brackets 80 are simply placed on the trunion areas of the axle and a clamp 82 is installed and held in place with bolts 84, as shown in FIG. 5a. On the other hand, when pneumatic tires are used, then the arrangement of FIG. 5b is used to raise the mast to its original vertical position relative to the frame and to move the mast forward. As shown, an adapter 86 is placed between the axle and the bracket 80. This adapter is secured to the bracket by means of bolts 88 while the clamp is secured to the adapter 86 by bolts 84.

Figure 7:
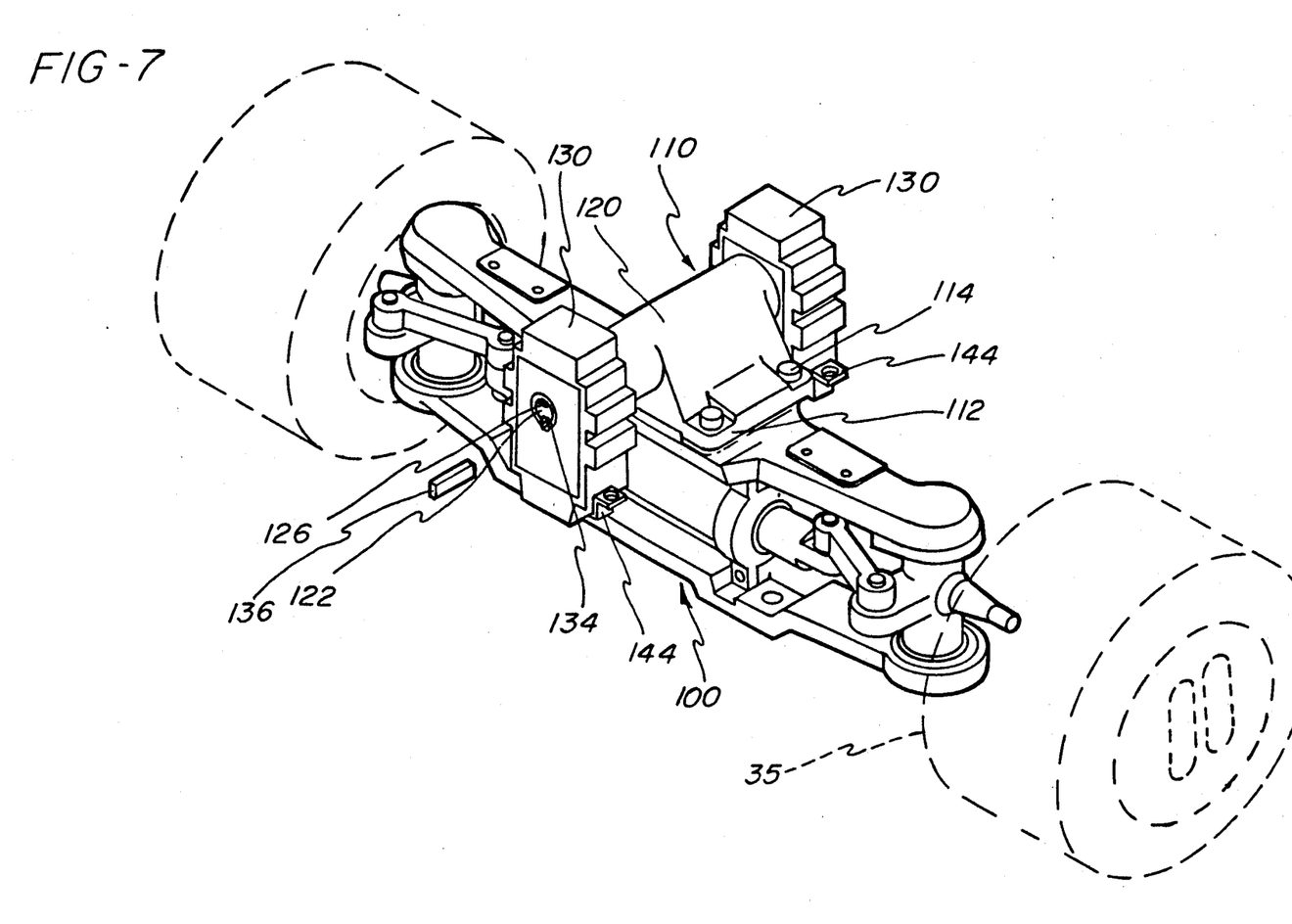
FIG. 7 is a perspective view showing the rear or second axle mounting arrangement.

The steer wheels 35 of the truck 10 are carried by a second or rear axle 100, as shown in FIG. 7. This axle may be supported in either of two vertical and two horizontal positions, as will be explained in connection with FIGS. 8a, 8b, 9a and 9b. The second axle is connected to the frame by a pivot member 110 that is an integral casting including a pad 112 provided with four bolt holes 114 that attach to the axle 100, and a generally cylindrical section 120 that is aligned perpendicualr to the axle 100. The ends of the cylindrical section 120 includes machined sections or journals 122 and 124 that are each provided with a pair of keyways 126. Note that the journal 122 is further away from the pad 112 than the journal 124. This allow the axle to be supported in either a first or a second horizontal position.

The pivot member 110 is connected to the frame 12 by means of a pair of resilient bushings 130. These bushings are formed of hard rubber and include a steel insert 132 provided with a keyway 134 for receiving the journals 122 and 124 of the pivot member 110. A key 136 installed in the keyway will prevent relative rotational movement between the pivot member 110 and the bushing 130. The steel insert is positioned asymmetrically vertically with respect to the bushing 130 so that it may be installed in either of the configurations shown in FIG. 8a or 8b.

The resilient bushings are attached to the truck frame as shown in FIGS. 8a, 8b, 9a and 9b. A pair of rails 140 are welded to the frame 12, and an end plate 142 is welded between the rails to form a compartment into which a bushing 130 is placed. A clamp 144 holds the bushing in place. These bushings provide the support for the rear wheels and resist movement of the wheels relative to the frame while allowing some movement to accommodate roughness in the floor.

Figure 8A:
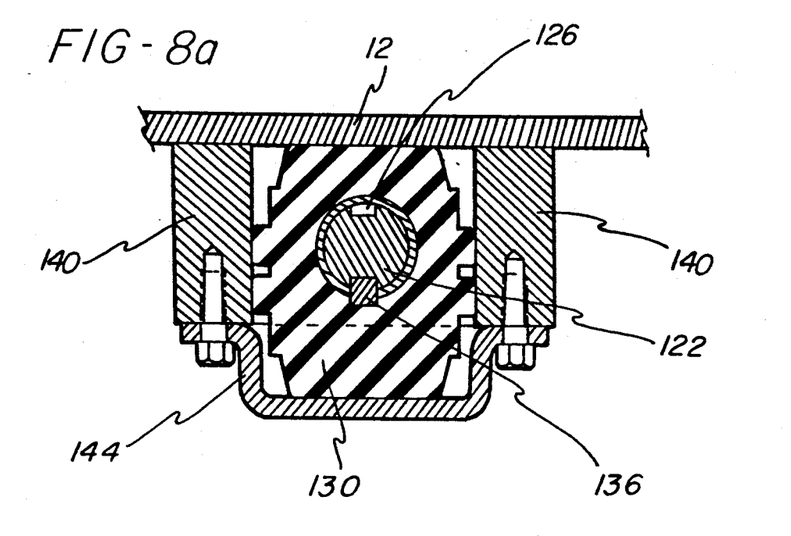
FIGS. 8a and 8b are cross sectional views showing the mounting of the resilient bushing for the cushion and pneumatic tire configurations, respectively.
Figure 8B:
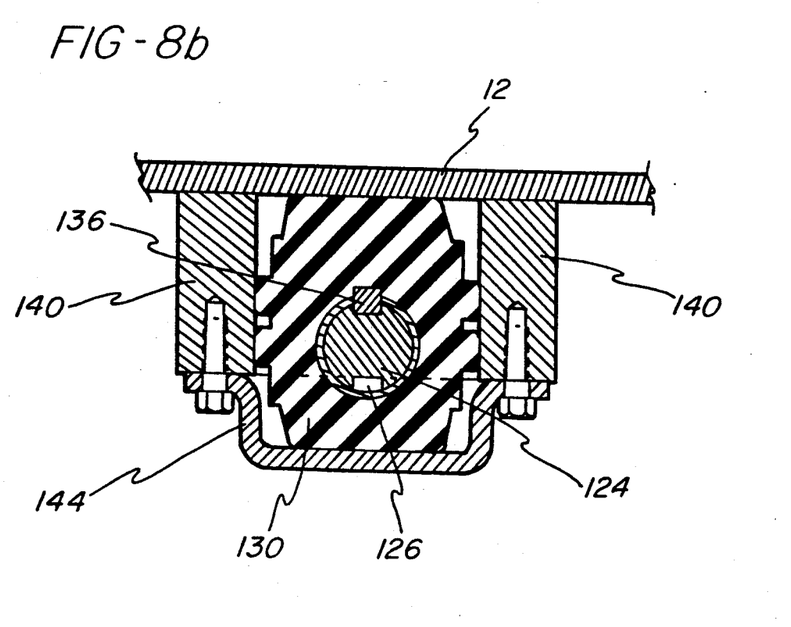

As shown in FIGS. 8a and 8b, the bushing 130 may be mounted in one of two vertical configurations. Also, as shown in FIGS. 9a and 9b, the pivot member may be mounted in one of two horizontal configurations.

Figure 9A:
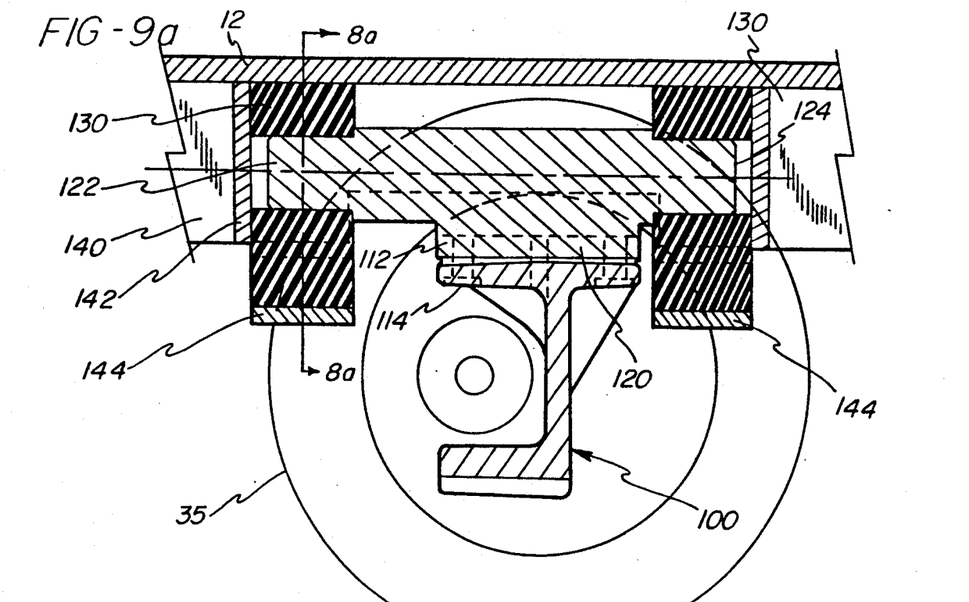
FIGS. 9a and 9b are cross sectional views showing the mounting of the pivot member for the cushion and pneumatic tire configurations, respectively.
Figure 9B:
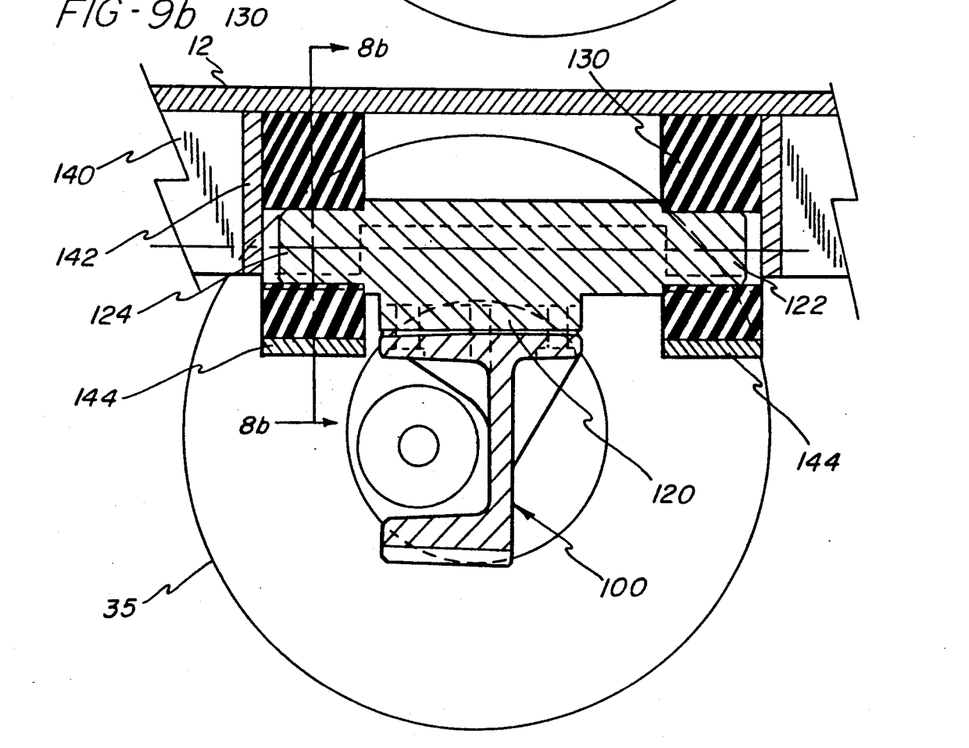

FIGS. 8a and 9a show the proper configuration when cushion tires are used, namely, the axle pivot member is mounted in the upper position and toward the forward part of the truck while FIGs. 8b and 9b show the proper configuration for pneumatic tires, namely that the pivot member in lowered and rotated from front to rear to move the axle 100 toward the rear. The outline of the tire 35 in FIGS. 9a and 9b show that the upper edge of the tire has approximately the same clearance from the frame 12 regardless of whether cushion or pneumatic tires are used.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. In a materials handling vehicle including
   a frame,
   a first axle supported on said frame for supporting a set of load wheels,
   a second axle supported on said frame for supporting a set of steered wheels,
   a mast assembly supported on said first axle for supporting and raising a load,
   the improvement comprising,
   means for supporting said first axle in one of a first and second vertical position,
   means for maintaining said mast assembly at a predetermined vertical position in either the first or second position of said first axle,
   means for supporting said second axle in one of a first and a second vertical position,
   means for supporting said second axle in one of a first and a second horizontal position.

2. The materials handling vehicle of claim 1 wherein said first position is selected when said load wheels include cushion tires.

3. The materials handling vehicle of claim 1 wherein said second position is selected when said load wheels include pneumatic tires.

4. The materials handling vehicle of claim 1 wherein said first axle supports the load wheels and wherein said means for supporting said first axle includes
   a first member permanently attached to said first axle and including multiple, vertically arranged, through holes for mounting bolts and a guide pin,
   a second member supported by said frame, and including multiple bolt receiving holes corresponding to the bolt holes in said first member in either said first or said second vertical position.

5. A materials handling vehicle including
   a frame,
   a first axle supported on said frame for carrying a first set of wheels,
   a second axle supported on said frame for carrying a second set of wheels,
   a mast assembly for supporting and raising a load, said mast assembly being carried by said first axle,
   the improvement, for permitting the vehicle to use one of cushion and pneumatic tires, comprising
   means for supporting said first axle on said frame in one of a first and a second vertical position, said means including
   a first member permanently attached to said first axle and including multiple, vertically arranged, bolt holes and a guide pin, and
   a second member supported by said frame, and including multiple bolt receiving holes corresponding to the bolt holes in said first member in either said first or said second vertical position, one of said bolt receiving holes receiving said guide pin for aligning said first member relative to said second member.
   means for supporting said second axle on said frame in one of a first and a second vertical position including a pivot member and a pair of resilient bushings, each of said bushings including a pivot member receiving opening positioned asymmetrically vertically whereby the pivot member is supported in one of two vertical positions, and
   means for supporting said second axle in one of a first and a second horizontal position, said means including said pivot member having a axle supporting pad positioned differentially between said bushings for supporting said axle lengthwise of said vehicle in one of two horizontal positions.

* * * * *